(12) United States Patent
Taffet et al.

(10) Patent No.: US 10,222,201 B2
(45) Date of Patent: Mar. 5, 2019

(54) VISUAL DEPTH MEASUREMENT GAGE

(71) Applicant: United Technologies Corporation, Farmington, CT (US)

(72) Inventors: Steven Taffet, South Windsor, CT (US); Anton Banks, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 280 days.

(21) Appl. No.: 15/210,576

(22) Filed: Jul. 14, 2016

(65) Prior Publication Data
US 2018/0017378 A1    Jan. 18, 2018

(51) Int. Cl.
| | |
|---|---|
| *G01B 11/22* | (2006.01) |
| *B23K 9/127* | (2006.01) |
| *G01B 11/02* | (2006.01) |
| *G01B 11/06* | (2006.01) |
| *B23K 31/02* | (2006.01) |
| *B23K 31/12* | (2006.01) |

(52) U.S. Cl.
CPC ............ *G01B 11/22* (2013.01); *B23K 9/1274* (2013.01); *B23K 31/02* (2013.01); *B23K 31/125* (2013.01); *G01B 11/026* (2013.01); *G01B 11/0608* (2013.01)

(58) Field of Classification Search
CPC .......... G01B 11/22; G01B 11/27; G01B 11/26
USPC .................... 33/286, 1 BB, 719, 836, 542
See application file for complete search history.

(56) References Cited

U.S. PATENT DOCUMENTS

| | | | | |
|---|---|---|---|---|
| 3,117,480 | A | * | 1/1964 | Peddinghaus .......... B21D 28/04 33/286 |
| 5,491,555 | A | * | 2/1996 | Romine ............... G01C 15/002 33/286 |
| 5,612,785 | A | | 3/1997 | Boillot |
| 6,263,584 | B1 | * | 7/2001 | Owens ................. B23D 59/002 33/286 |
| 6,301,997 | B1 | * | 10/2001 | Welte ...................... B25B 21/00 33/263 |

(Continued)

FOREIGN PATENT DOCUMENTS

EP        0922199      6/1999

OTHER PUBLICATIONS

EP Search Report dated Sep. 1, 2017 in EP Application No. 17179189.0.

*Primary Examiner* — Christopher W Fulton
(74) *Attorney, Agent, or Firm* — Snell & Wilmer L.L.P.

(57) ABSTRACT

Systems and methods for depth measurement are described herein. A depth measurement device may comprise a first light source configured to direct a first beam of light, a second light source configured to direct a second beam of light, and a mirror. The mirror may be for viewing at least one of the first beam of light and the second beam of light. The depth measurement device may further comprise a housing. The depth measurement device may further comprise an eyepiece. The first beam of light and the second beam of light may be configured to intersect at a desired location. The eyepiece may be configured to maintain a consistent line-of-sight between the eyepiece, the mirror, and the desired location. In various embodiments, the second beam of light may be oriented at an acute angle with respect to the first beam of light.

18 Claims, 4 Drawing Sheets

(56) References Cited

U.S. PATENT DOCUMENTS

| | | | | |
|---|---|---|---|---|
| 6,482,148 B1* | 11/2002 | Luke | ............ | A61B 1/00183 |
| | | | | 600/117 |
| 6,708,782 B1* | 3/2004 | Turney | ............ | E21B 7/067 |
| | | | | 175/40 |
| 2002/0069542 A1* | 6/2002 | Musacchia, Jr. | ...... | B23D 59/002 |
| | | | | 33/286 |
| 2003/0221324 A1* | 12/2003 | Myron | ............ | H05B 37/0227 |
| | | | | 33/286 |
| 2008/0276473 A1* | 11/2008 | Raschella | ............ | F41G 1/35 |
| | | | | 33/286 |
| 2010/0123904 A1* | 5/2010 | Yamakawa | ............ | G01B 11/02 |
| | | | | 356/614 |
| 2015/0279035 A1* | 10/2015 | Wolski | ............ | G01B 11/0608 |
| | | | | 348/148 |
| 2016/0039045 A1* | 2/2016 | Webster | ............ | B23K 26/032 |
| | | | | 356/496 |
| 2016/0097635 A1 | 4/2016 | Hirano | | |

\* cited by examiner

VISUAL DEPTH MEASUREMENT GAGE

FIELD

This disclosure relates generally to inspection systems, and more particularly to a depth measurement system for a part, such as an airfoil for a turbine engine.

BACKGROUND

Engine members, such as turbine airfoils, typically include complex internal features. Some of these features, such as a brazed joint, may benefit from visual inspection. However, inspection of these features may be difficult due to various conditions, such as limited access to the feature.

SUMMARY

Systems and methods for depth measurement are described herein, in accordance with various embodiments. A depth measurement device may comprise a first light source configured to direct a first beam of light, a second light source configured to direct a second beam of light, and a mirror for viewing at least one of the first beam of light and the second beam of light.

In various embodiments, the second beam of light may be oriented at an acute angle with respect to the first beam of light. The depth measurement device may further comprise a housing and an eyepiece coupled to the housing. The first beam of light and the second beam of light may be configured to intersect at a desired distance from the housing. The desired distance may correspond to a distance between the housing and an internal feature. At least one of the internal feature, the first beam of light, or the second beam of light may be viewable through the eyepiece via the mirror. The depth measurement device may be configured to indicate that the internal feature is located at the desired distance in response to the first beam of light and the second beam of light coinciding at the internal feature. The depth measurement device may further comprise a third light source for illuminating at least the internal feature. The mirror may comprise a visible marking for indicating a relative location of the first beam of light with respect to the second beam of light.

A depth measurement device may comprise a first light source configured to direct a first beam of light towards an internal feature, a second light source configured to direct a second beam of light towards the internal feature, and a mirror for viewing at least a portion of the first beam of light and the second beam of light.

In various embodiments, the first beam of light and the second beam of light may be configured to intersect at a desired dimension of the internal feature. The mirror may comprise a visible marking for indicating a relative location of the first beam of light with respect to the second beam of light. The location of the internal feature may be indicated in response to the relative location of the first beam of light with respect to the second beam of light. The depth measurement device may further comprise a housing. At least one of the first light source, the second light source, and the mirror may be coupled to the housing. The depth measurement device may further comprise an eyepiece for viewing the mirror. The housing may comprise a transparent surface comprising a visible marking for indicating a relative location of the first beam of light with respect to the second beam of light. The first beam of light and the second beam of light may pass through the transparent surface. The first light source may comprise a laser source. The second light source may comprise a laser source.

A method of measuring an internal feature of a member may comprise placing a depth measurement device over an opening of the member, the internal feature being visible via the opening, directing a first beam of light towards an internal feature, the first beam of light being generated by a first light source coupled to the depth measurement device, directing a second beam of light towards the internal feature, the second beam of light being generated by a second light source coupled to the depth measurement device, and reflecting, by a mirror, at least a portion of the first beam of light and the second beam of light.

In various embodiments, the method may further comprise determining if the first beam of light and the second beam of light intersect at the internal feature.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Engine members, such as turbine airfoils, typically include complex internal features. Some of these features, such as a braze or brazed joint for example, may be visible. However, inspection of these features may be difficult due to various conditions, such as limited access to the feature. For example, the internal feature may not be reachable via a measurement tool, such as a caliper.

A visual depth measurement device is provided herein which uses two or more beams of light, such as laser beams for example, to determine if an internal feature comprises a desired dimension. The beams of light may be calibrated before performing the measurement. In this regard, the visual depth measurement device may be tuned to perform measurements on internal features having known desired dimensions. The visual depth measurement device operates by directing beams of light towards the internal feature. In response to the internal feature being located at its desired dimension, the beams of light may intersect at the internal feature. In response to the internal feature being at a location which is less than or greater than the desired dimension, the beams of light may not intersect at the internal feature. A mirror is provided for viewing the internal feature, and the beams of light, through an eyepiece of the measurement device. Thus, a user or optical sensor may determine if an internal feature is located at its respective desired dimension by determining if the beams of light intersect at the internal feature.

Figure 1A:
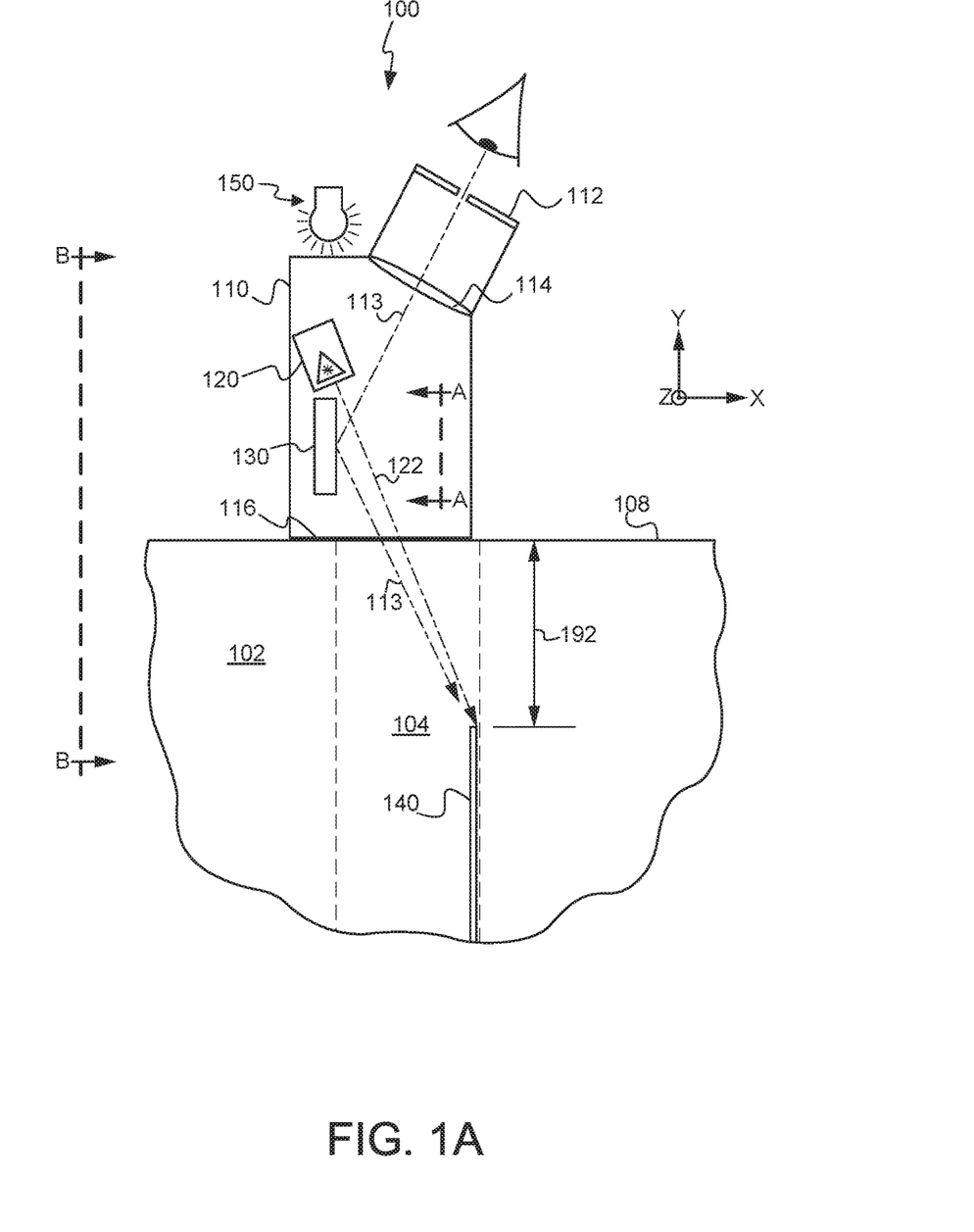
FIGS. 1A-1B illustrate a measuring device placed over an internal feature, in accordance with various embodiments.
Figure 1B:
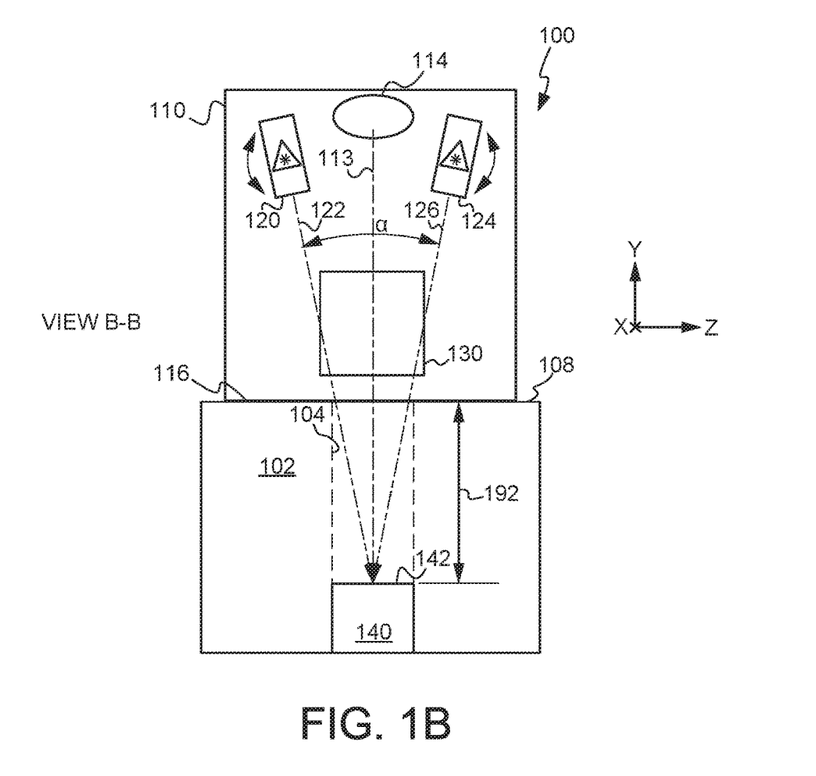

With reference to FIG. 1A and FIG. 1B, a schematic view of a visual depth measurement device (also referred to as a measurement device) 100 is illustrated, in accordance with various embodiments. Xyz-axes are provided for ease of illustration. Measurement device 100 may comprise a housing 110, an eyepiece 112, a first light source 120, a second light source 124, and a mirror 130. Measurement device 100 may be for measuring a desired dimension of an internal feature of a device. FIG. 1A and FIG. 1B illustrate measurement device placed over an opening 104 of a member 102. In various embodiments, member 102 may comprise an airfoil, such as a turbine engine blade or turbine engine vane, for example. In various embodiments, member 102 may comprise any device having an internal feature. In various embodiments, opening 104 may comprise a bore, slot, slit, trench, cavity, or any other type of opening. An internal feature (also referred to as a feature) 140 may be located within opening 104. In various embodiments, feature 140 may comprise a braze (or braze filler), a brazed joint, a weld, or a solder. In various embodiments, feature 140 may comprise any portion of member 102.

Feature 140 may have a desired dimension (dimension) (also referred to herein as a desired distance) 192. Although illustrated as the distance between outer surface 108 of member 102 and feature 140, dimension 192 may comprise any distance corresponding to feature 140. In various embodiments, dimension 192 may comprise a distance between housing 110 and feature 140. In various embodiments, dimension 192 may comprise a distance between a portion of housing 110 and feature 140. In various embodiments, measurement device 100 may aid in determining if dimension 192 of feature 140 varies within a single member 102. In various embodiments, measurement device 100 may aid in determining if dimension 192 of feature 140 varies between various members 102. In this regard, measuring device 100 may aid in quality control of member 102, in accordance with various embodiments.

With measurement device 100 placed over opening 104, as illustrated in FIG. 1A and FIG. 1B, a user may look through eyepiece 112 and see at least a portion of feature 140 via mirror 130. In this regard, imaginary line 113 may represent the line-of-sight of said user. It should be appreciated that eyepiece 112 may aid in maintaining consistent alignment of the line-of-sight, as represented by imaginary line 113, with respect to feature 140.

In various embodiments, an optical sensor may view mirror 130. In this regard, imaginary line 113 may represent the line-of-sight of said optical sensor. Said optical sensor may generate an image of mirror 130 and said image may be sent to a controller for determining the position of feature 140. In various embodiments, eyepiece 112 may comprise said optical sensor. However, said optical sensor may be located in any location capable of sensing feature 140 via mirror 130.

In various embodiments, with reference to FIG. 1A and FIG. 1B, first light source 120 may generate first beam of light 122. Second light source 124 may generate second beam of light 126. First beam of light 122 and second beam of light 126 may be directed towards feature 140. In various embodiments, first beam of light 122 and second beam of light 126 may be directed towards an outer portion 142 of feature 140.

In various embodiments, first light source 120 and second light source 124 may comprise devices for directing beams of light (i.e., first beam of light 122 and second beam of light 126). In various embodiments, first light source 120 and second light source 124 may comprise laser sources or sources configured to generate laser beams. In this regard, first beam of light 122 and second beam of light 126 may comprise laser beams.

In various embodiments, with continued reference to FIG. 1A and FIG. 1B, although illustrated as being directly projected from first light source 120 to feature 140, it should be appreciated that first beam of light 122 may projected from first light source 120 to feature 140 via one or more mirrors or reflective surfaces.

Figure 1C:
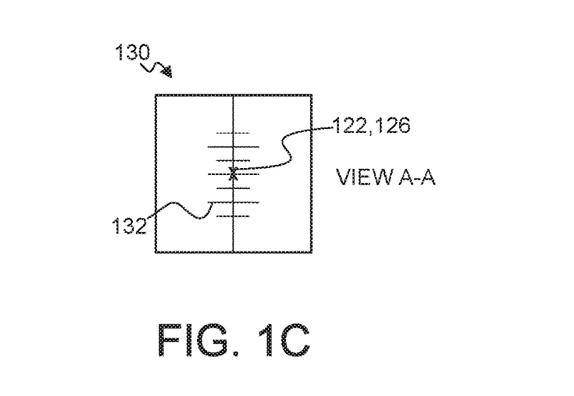
FIG. 1C illustrates the mirror of the measuring device of FIGS. 1A-1B, in accordance with various embodiments.

In various embodiments, with additional reference to FIG. 1C, first beam of light 122 and second beam of light 126 may intersect at feature 140. FIG. 1C illustrates an exemplary embodiment of mirror 130 in response to first beam of light 122 and second beam of light 126 intersecting at feature 140. In this regard, first beam of light 122 and second beam of light 126 may coincide. Stated another way, first beam of light 122 and second beam of light 126 may overlap as viewed from mirror 130. In various embodiments, mirror 130 may comprise a visible marker 132. Visible marker 132 may be disposed on mirror 130 to provide a reference of the relative locations of first beam of light 122 and second beam of light 126. In this regard, mirror 130 may be configured to reflect an image of the first beam of light 122, the second beam of light 126, and/or the feature 140. As illustrated in FIG. 1C, visible marker 132 may comprise linear graduations. However, as illustrated in FIG. 4B, a visible marker may comprise zones or any other suitable markings to indicate to a user a relative distance between first beam of light 122 and second beam of light 126.

With reference to FIG. 1A, measuring device 100 may further comprise a third light source 150. In various embodiments, third light source 150 may be coupled to an outer surface of housing 110. In various embodiments, third light source 150 may be coupled to an inner surface of housing 110. In various embodiments, third light source 150 may be separate from housing 110. In various embodiments, third light source 150 may comprise an illuminating device such as light emitting diodes (LED), incandescent bulbs, fluorescent bulbs, ambient lighting, or any other light source for illuminating at least a portion of measuring device 100. Third light source 150 may illuminate opening 104. Third light source 150 may illuminate feature 140. In various embodiments, eyepiece 112 may comprise a focal lens 114.

With reference to FIG. 1B, first light source 120 and/or second light source 124 may be rotatable (about the x-axis in FIG. 1B). In various embodiments, first light source 120 and/or second light source 124 may be configured to be manually rotated, for example by a knob or lever. In various embodiments, the rotation of first light source 120 and/or second light source 124 may be automated, for example by an electromechanical motor. First beam of light 122 and second beam of light 126 may be oriented at angle α. Angle α may comprise an acute angle. In various embodiments, angle α may be determined by the desired dimension 192 of the feature 140 to be measured. For example, FIG. 1B illustrates first light source 120 and second light source 124 being configured to, or tuned to, determine if a feature is located at desired dimension 192. However, first light source 120 and second light source 124 may be rotated away from each other, such that angle α decreases, in order to be tuned to determine if a feature is located at a dimension which is greater than desired dimension 192. Conversely, first light source 120 and second light source 124 may be rotated towards each other, such that angle α increases, in order to be tuned to determine if a feature is located at a dimension which is less than desired dimension 192. In this regard, measuring device 100 may be tuned to measure a first feature having a first desired dimension at a first time, and then re-tuned to measure a second feature having a second desired dimension at a second time.

In various embodiments, although first light source 120 and second light source 126 are positioned side-by-side in the z-direction, in various embodiments, first light source 120 and second light source 126 may be positioned side-by-side in the x-direction. In this regard, with momentary reference to FIG. 2B, the BAD-OK-BAD zones may be oriented vertically, as opposed to horizontally as illustrated in FIG. 2B (i.e., rotated ninety degrees from the orientation illustrated in FIG. 2B). In this regard, it should be appreciated that first light source 120 and second light source 126 may be positioned in any location such that first light source 122 and second light source 126 are configured to intersect on, or in close proximity to, feature 140.

With reference to FIG. 1A and FIG. 1B, mirror 130 and eyepiece 112 may be located in close proximity to surface 116, in accordance with various embodiments. It should be appreciated that positioning eyepiece 112 and mirror 130 in close proximity to surface 116, and thus closer to feature 140, may allow the line-of-sight, as illustrated by imaginary line 113, to be oriented as normal an orientation as possible, wherein a normal orientation in this regard may refer to the x-z plane. Positioning eyepiece 112 and mirror 130 in this manner may aid in generating more accurate measurements. In this regard, eyepiece 112 and mirror 130 may be positioned such that the line-of-sight, as illustrated by imaginary line 113, is as parallel to surface 116 as possible, while still maintaining feature 140 in the line-of-sight.

Figure 2A:
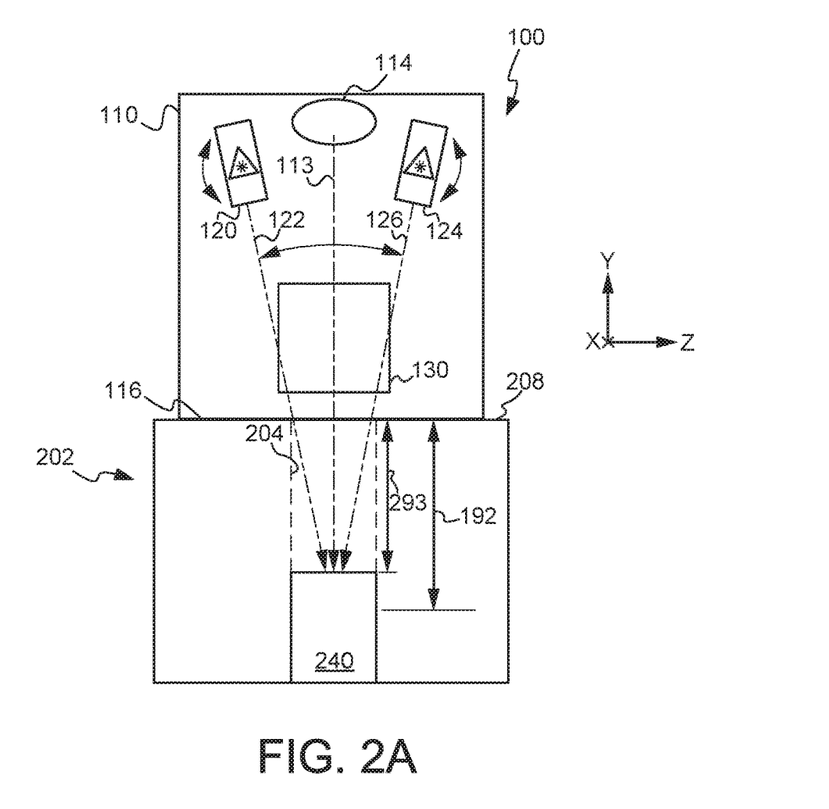
FIG. 2A illustrates a schematic view of the measuring device of FIG. 1B being placed over a member having a feature which is not located at its desired dimension, in accordance with various embodiments.
Figure 2B:
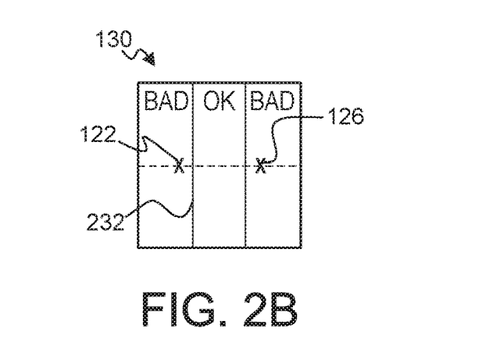
FIG. 2B illustrates the mirror of the measuring device of FIG. 4A with a first beam of light and a second beam of light forming discrete points on the mirror, in accordance with various embodiments.

With respect to FIG. 2A, elements with like element numbering, as depicted in FIG. 1A and FIG. 1B, are intended to be the same and will not necessarily be repeated for the sake of clarity.

FIG. 2A illustrates the measuring device of FIG. 1A and FIG. 1B having been placed over a member 202 with an opening 204. Internal feature 240 may be located within opening 204. In various embodiments, member 202, opening 204, and internal feature 240 may be similar to member 102, opening 104, and feature 140, in accordance with various embodiments. Unlike feature 140 of FIG. 1A and FIG. 1B, internal feature 240 may be located at a distance 293 from outer surface 208. However, internal feature 240 may comprise the desired dimension 192. Stated another way, it may be desired for internal feature 240 to be located at a distance from outer surface 208 of member 202 equivalent to the desired dimension. In response to measuring device 100 being tuned to desired dimension 192, and internal feature 240 being located at distance 293, which is less than desired dimension 192, first beam of light 122 and second beam of light 126 may not intersect at internal feature 240. In this regard, with additional reference to FIG. 2B, first beam of light 122 and second beam of light 126 may form discrete points on mirror 130, which may indicate to a user that internal feature 240 is not located at desired dimension 192. Although illustrated as having visible marker 132 in FIG. 1C, in various embodiments, mirror 130 may comprise visible marker 232. Visible marker 232 may be similar to visible marker 132. Visible marker 232 may define zones, such as an "OK" zone which indicates to a user that internal feature 240 is located within a threshold value of the desired dimension 192. Conversely, visible marker 232 may define zones, such as "BAD" zones which indicate to a user that internal feature 240 is not located within a threshold value of the desired dimension 192.

With reference to FIGS. 1A-1C, although having described visible marker 132 as being disposed on mirror 130, in various embodiments, visible marker 132 may be disposed on surface 116 of housing 110, wherein the visible marker 132 is located in the line-of-sight, as illustrated by imaginary line 113. In this regard, surface 116 may comprise a transparent surface. Furthermore, first beam of light 122 and second beam of light 126 may be directed through surface 116. Stated another way, first beam of light 122 and second beam of light 126 may pass through surface 116. In various embodiments, surface 116 may comprise an aperture through which first beam of light 122 and second beam of light 126 may pass. In this regard, feature 140 may be viewable through said aperture.

Figure 3:
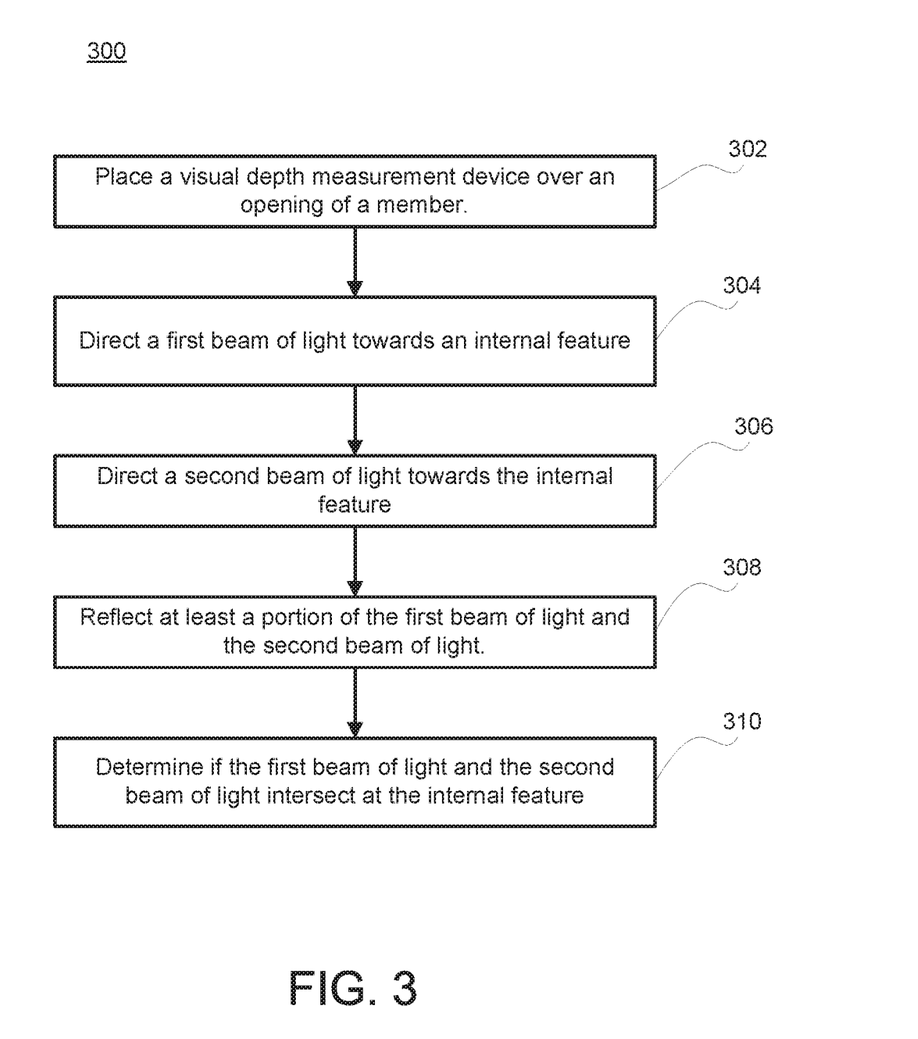
FIG. 3 illustrates a method for measuring an internal feature of a member, in accordance with various embodiments.

With reference to FIG. 3, a method 300 for measuring an internal feature of a member is illustrated, in accordance with various embodiments. Method 300 may include placing a visual depth measurement device over an opening of a component (step 302). Method 300 may include directing a first beam of light towards an internal feature (step 304). Method 300 may include directing a second beam of light towards the internal feature (step 306). Method 300 may include reflecting at least a portion of the first beam of light and the second beam of light (step 308). Method 300 may include determining if the first beam of light and the second beam of light intersect at the internal feature (step 310).

With additional reference to FIG. 1A and FIG. 1B, step 302 may include placing measurement device 100 over opening 104 of member 102. Step 304 may include directing first beam of light 122 towards internal feature 140. Step 306 may include directing second beam of light 126 towards internal feature 140. In various embodiments, the directing may be in response to the placing. Step 308 may include reflecting, by mirror 130, at least a portion of first beam of light 122 and at least a portion of second beam of light 126.

Step 310 may include determining if the first beam of light 122 and the second beam of light 126 intersect at the internal feature 140.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A depth measurement device comprising:
    a first light source configured to direct a first beam of light;
    a second light source configured to direct a second beam of light;
    a mirror for viewing at least one of the first beam of light and the second beam of light;
    wherein the first beam of light and the second beam of light are configured to intersect at a desired distance from the first and second light sources; and
    the depth measurement device indicates a position of an object surface relative to the desired distance based upon a distance between a first location of the object surface intersected by the first light beam and a second location of the object surface intersected by the second light beam.

2. The depth measurement device of claim 1, wherein the second beam of light is oriented at an acute angle with respect to the first beam of light.

3. The depth measurement device of claim 1, further comprising a housing and an eyepiece coupled to the housing.

4. The depth measurement device of claim 3, wherein the desired distance corresponds to a distance between the housing and an internal feature.

5. The depth measurement device of claim 4, wherein at least one of the internal feature, the first beam of light, or the second beam of light are viewable through the eyepiece via the mirror.

6. The depth measurement device of claim 4, wherein the depth measurement device is configured to indicate that the internal feature is located at the desired distance in response to the first beam of light and the second beam of light coinciding at the internal feature.

7. The depth measurement device of claim 4, further comprising a third light source for illuminating at least the internal feature.

8. The depth measurement device of claim 1, wherein the mirror comprises a visible marking for indicating a relative location of the first beam of light with respect to the second beam of light.

9. A depth measurement device comprising:
    a first light source configured to direct a first beam of light towards an internal feature;
    a second light source configured to direct a second beam of light towards the internal feature; and
    a mirror for viewing at least a portion of the first beam of light and the second beam of light;
    wherein the first beam of light and the second beam of light are configured to intersect at a desired distance from the first and second light sources; and
    the depth measurement device indicates a position of an object surface relative to the desired distance based upon a distance between a first location of the internal feature intersected by the first light beam and a second location of the internal feature intersected by the second light beam.

10. The depth measurement device of claim 9, wherein the mirror comprises a visible marking for indicating a relative location of the first beam of light with respect to the second beam of light.

11. The depth measurement device of claim 10, wherein the location of the internal feature is indicated in response to the relative location of the first beam of light with respect to the second beam of light.

12. The depth measurement device of claim 9, further comprising a housing, at least one of the first light source, the second light source, and the mirror being coupled to the housing.

13. The depth measurement device of claim 12, further comprising an eyepiece for viewing the mirror.

14. The depth measurement device of claim 12, wherein the housing comprises a transparent surface comprising a visible marking for indicating a relative location of the first beam of light with respect to the second beam of light.

15. The depth measurement device of claim 14, wherein the first beam of light and the second beam of light pass through the transparent surface.

16. The depth measurement device of claim 9, wherein at least one of the first light source and the second light source comprise a laser source.

17. A method of measuring an internal feature of a member comprising:
- placing a depth measurement device over an opening of the member, the internal feature being visible via the opening;
- directing a first beam of light towards an internal feature, the first beam of light being generated by a first light source coupled to the depth measurement device;
- directing a second beam of light towards the internal feature, the second beam of light being generated by a second light source coupled to the depth measurement device;
- directing the first beam of light and the second beam of light to intersect at a desired distance from the first and second light sources,
- reflecting, by a mirror, at least a portion of the first beam of light and the second beam of light; and
- indicating a position of the internal feature relative to the desired distance based upon a distance between the first light beam and the second light beam at a surface of the internal feature.

18. The method of claim 17, further comprising:
determining if the first beam of light and the second beam of light intersect at the internal feature.

* * * * *